//

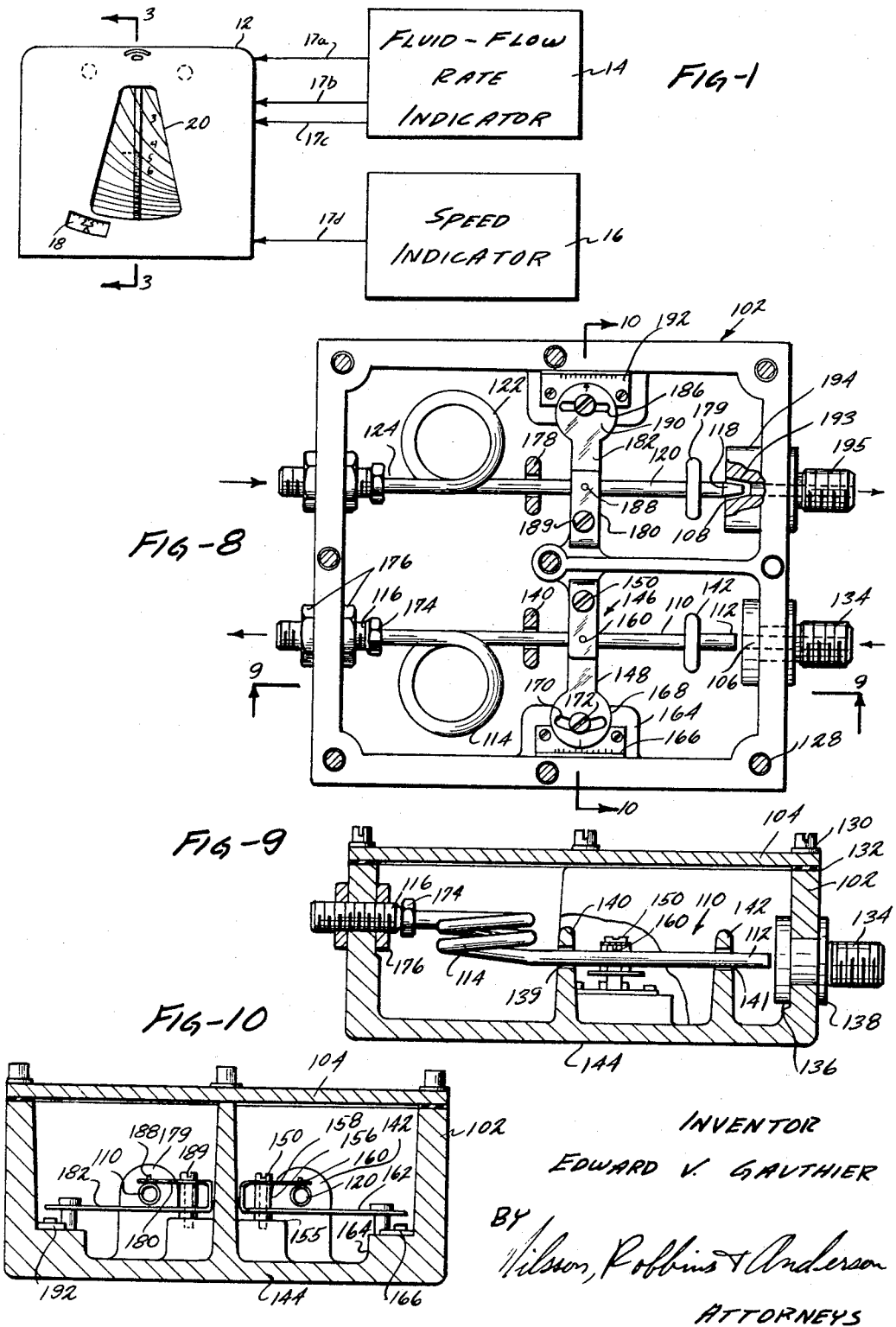

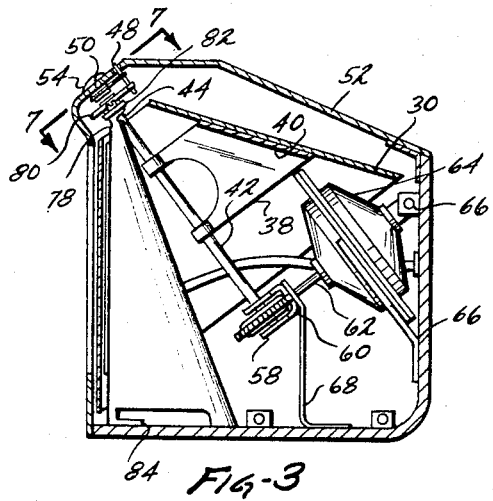
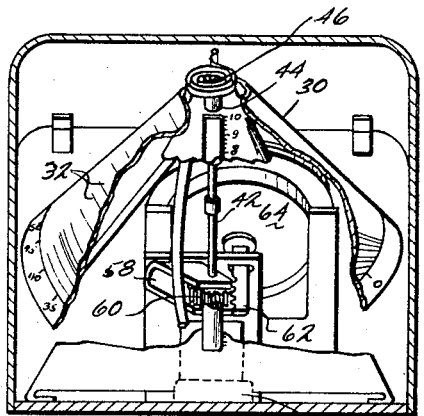
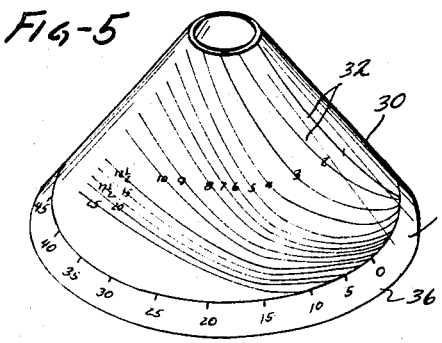
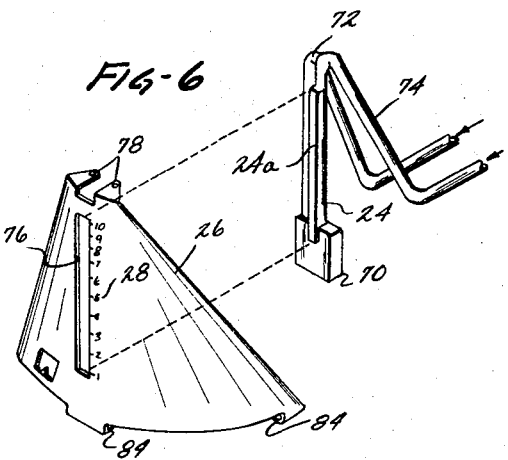
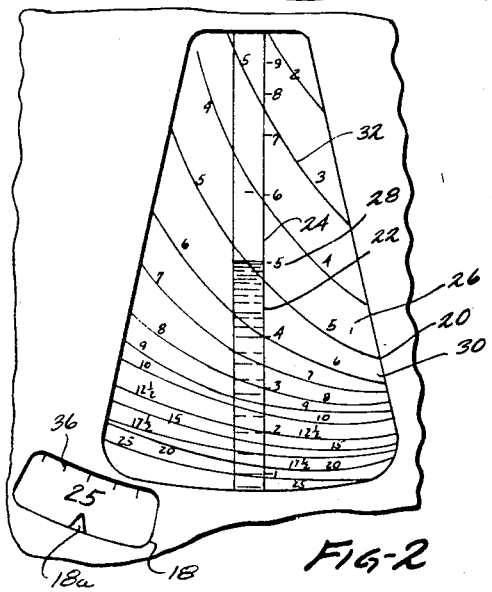
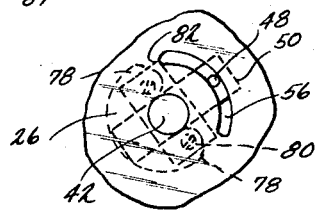
INVENTOR
EDWARD V. GAUTHIER
ATTORNEYS

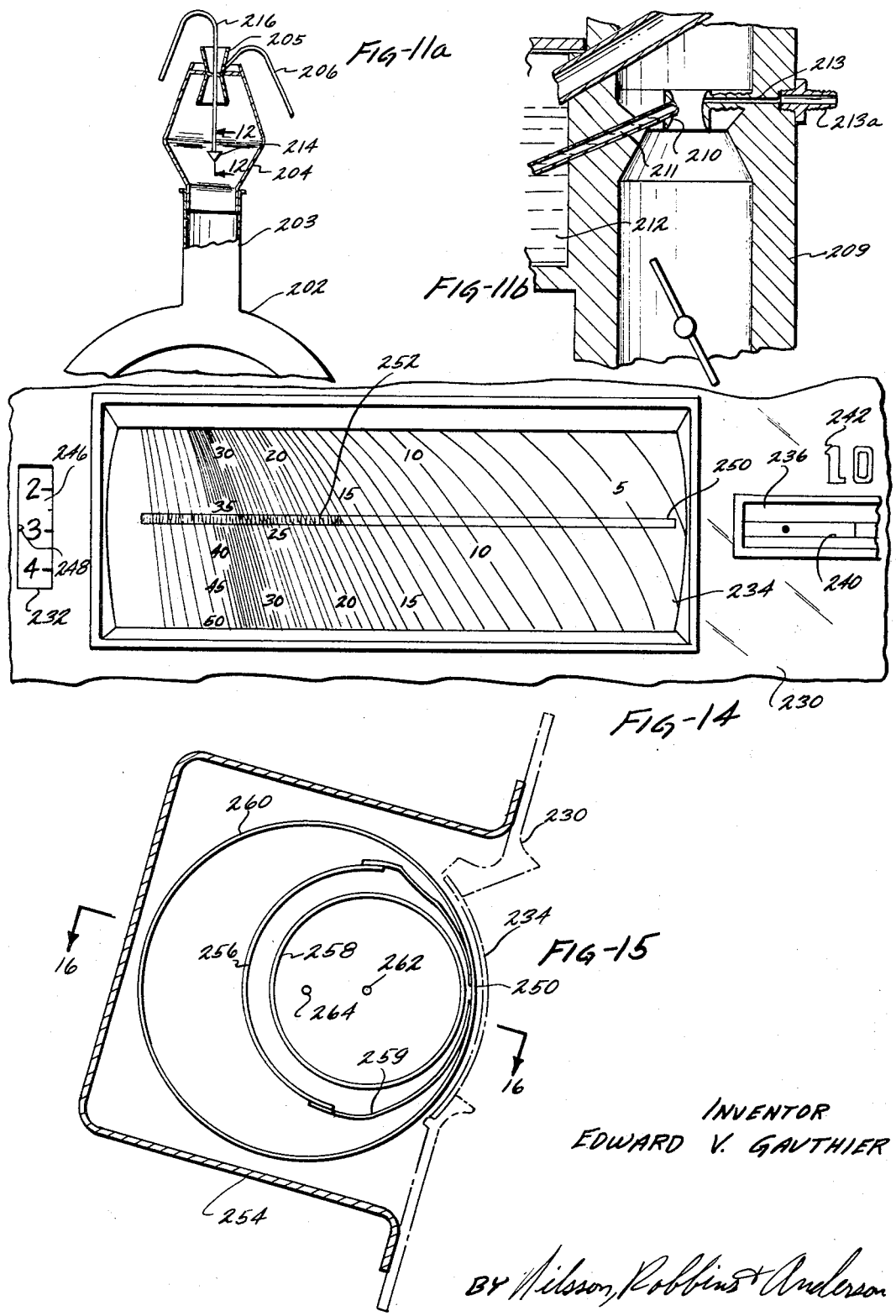

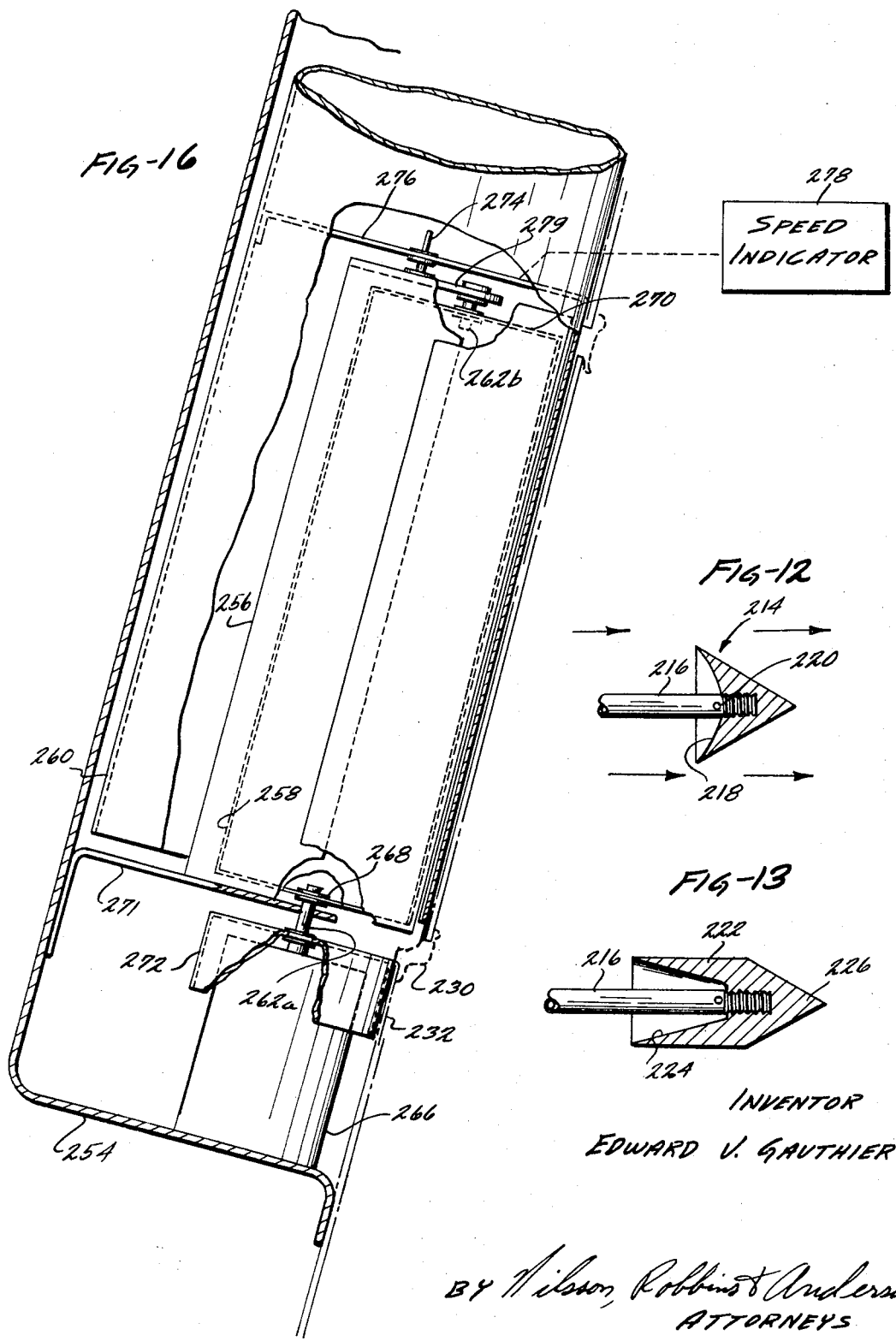

3,405,554
INTEGRATED METER SYSTEM
Edward V. Gauthier, 2205 San Anseline, Apt. 3,
Long Beach, Calif. 90815
Filed July 6, 1965, Ser. No. 469,494
11 Claims. (Cl. 73—114)

ABSTRACT OF THE DISCLOSURE

A fuel rate-of-consumption instrument is disclosed, as for use on a vehicle. Measurements of speed and fuel flow are integrated by a rotary two-dimension dial (conical and cylindrical are disclosed) which is displaced in relation to speed to establish one coordinate and a line indicator (fluid column or mask and curve) then designates the other coordinate in relation to fuel flow. Specific fuel-flow measuring apparatus is disclosed, including a unit that compares dynamic and static pressure to formulate a pressure signal to displace a fluid column accordingly.

---

The present invention relates to an integrated system of instrumentation, and more specifically to a system which may be embodied to integrate measurements of the speed at which a power-driven vehicle is traveling, and the rate at which the vehicle is consuming fuel, to provide a continuous indication of fuel consumption, related to distance.

The operators and owners of various motor-driven vehicles are often quite concerned about fuel economy. For example, it is common practice among many individual vehicle operators, as well as commercial operators, to gauge the fuel consumed by a vehicle in traveling a substantial distance, then to calculate the rate of fuel consumption, with reference to a convenient unit of distance, for example, in miles per gallon. This practice is widespread in conjunction with the use of virtually all forms of fuel-powered vehicles, e.g. automotive vehicles, boats, and airplanes.

The measurement of fuel consumption related to a convenient unit of distance is valuable to indicate the condition of the vehicle, the relative economy of operating the vehicle, and furthermore, to assist in planning the use of the vehicle. However, the measurement of fuel consumption, e.g. miles per gallon, for a particular vehicle may vary widely depending upon the environment and manner of operation. For example, the rate of fuel consumption is generally related to speed, acceleration rates, atmospheric conditions and so on. Therefore, a general knowledge of the average rate of fuel consumption for a vehicle may be extremely inaccurate at any given instant of operation. As a result, a need exists for an instrument or meter to continuously manifest the rate of fuel consumption related to distance, not only to enable more efficient operation of the vehicle, but further, to indicate its condition.

In an attempt to satisfy this need, various prior instruments have been proposed. For example, one form of prior instrument functioned to repeatedly indicate an average rate of fuel consumption over a brief span of time and at frequent intervals. Other forms of instruments have integrated various measurements to provide the desired measurement somewhat continuously. However, such prior instruments and systems have been generally expensive, delicate, or inaccurate; and therefore have not come into widespread use.

An object of the present invention is to provide an improved integrating instrument, which may be embodied in a form to indicate measurements, as miles per gallon, for a vehicle driven by a fuel-consuming engine.

Another object of the present invention is to provide an improved instrument for integrating manifestations of separate measurements on a two-dimensional scale, whereby one measurement establishes a location in one dimension while the other measurement establishes a location in the other dimension, thereby jointly specifying a value on the scale.

Still another object of the present invention is to provide an improved instrument for manifesting integrated measurements, e.g. miles per gallon, which system may be economically manufactured, and used over long intervals of time without substantial maintenance.

A further object of the present invention is to provide an improved instrument for integrating measurements of pressure and physical displacement, wherein the physical displacement manifestation sets a two-dimensional scale to indicate one location thereon, while the observed pressure acts on a liquid column to indicate another location on the scale, thereby manifesting an integrated measurement.

One further object of the present invention is to provide an effective meter for sensing the rate of travel of a vehicle and the time rate of fuel consumption of the vehicle's engine, whereby to integrate such measurements and provide a manifestation of the rate of fuel consumption related to distance.

These and other objects and advantages of the present invention will become apparent from a consideration of the following taken in conjunction with the drawings; wherein:

FIG. 1 is a diagrammatic and pictorial representation illustrating one form of the present invention;

FIG. 2 is an enlarged view of a portion of the representation of FIG. 1;

FIG. 3 is a sectional view taken along line 3—3 of FIG. 1;

FIG. 4 is an internal sectioned view of a portion of the structure of FIG. 1;

FIG. 5 is a perspective view of a component of the system of FIG. 1;

FIG. 6 is a perspective exploded view of another component of the structure of FIG. 1;

FIG. 7 is a sectional view taken along line 7—7 of FIG. 3;

FIG. 8 is a sectional plan view of an embodiment of one component of the system of FIG. 1;

FIG. 9 is a sectional view taken along line 9—9 of FIG. 8;

FIG. 10 is a sectional view taken along line 10—10 of FIG. 8;

FIG. 11a is a diagrammatic view of an alternate form of one component of the system of FIG. 1;

FIG. 11b is a diagrammatic view of another alternate form of the component of FIG. 11a;

FIG. 12 is a sectional view taken along line 12—12 of FIG. 11a;

FIGURE 13 is a view similar to FIGURE 12, showing an alternate structure;

FIGURE 14 is a fragmentary enlarged plan view of an alternate form of one component of the system of FIGURE 1;

FIGURE 15 is a sectional view taken vertically through the structure of FIGURE 14; and FIGURE 16 is a sectional view taken along line 16—16 of FIGURE 15.

Referring initially to FIGURE 1, there is shown an instrument 12 serving as a display device, and connected to receive signal information from a flow-rate indicator 14 and a speed indicator 16. Basically, in the operation of the system the speed indicator 16 provides information signals to the instrument 12 indicative of speed, as for example a measure of miles per hour. The flow-rate indicator 14 then provides the instrument 12 signal information indicative of a fuel consumption rate, e.g. gallons per hour. The instrument 12 integrates the received signal information to manifest the rate of fuel consumption related to distance. For example, the instrument 12 may manifest fuel consumption in miles per gallon as a generally well known and widely used unit of measure.

In providing the information signals to the instrument 12, four information paths are shown, i.e. lines 17a, 17b, 17c, and 17d. The lines 17a and 17b may take the form of fluid pressure ducts herein, as described in detail below, to deliver a pressure differential to the instrument 12 which is indicative of the rate of fuel flow, e.g. gallons per hour.

The line 17c serves to provide a signal indicative of the temperature of the fuel, to compensate for changes resulting from temperature variations. A well-known electrical sensor and meter movement can for example, be employed for this structure.

The line 17d provides speed information and may comprise, for example, a mechanical coupling or various other signal means. As disclosed herein, a mechanical shaft serves as the line 17d to provide a physical displacement or position, indicative of speed.

Of course, a wide variety of different sensors or transducers may be employed in accordance with the present invention to provide signal information to the instrument 12 for integration into the desired output manifestation.

Considering the instrument 12 further, reference will now be made to FIGURE 2, showing the face of the instrument 12 in greater detail. The face incorporates a small window 18 (at the lower left) in which speed, e.g. miles per hour, is indicated, illustratively reading "25" as designated by a pointer 18a. The face of the instrument also has a larger central window 20 in which rate of fuel consumption is manifest, related both to time and to distance.

The window 20 displays a fluid column 22 contained in a transparent tube 24. The fluid in the column 22 may take various forms; however, normally selection will be made with a view toward effective contrast and displacement. The tube 24 is mounted in a mask 26 (FIGURE 6) which carries numerical value indications 28, designated by the level of the fluid column. In operation, the position of the fluid column or height of the surface thereof, indicates a particular indication 28 which manifest the rate of fuel consumption with respect to time, e.g. gallons per hour.

The mask 26 and the tube 24 are positioned behind a transparent, rotary scale 30 (FIGURE 5) a section of which is displayed in the window 20 (FIGURE 2) and which indicates fuel consumption with respect to distance, e.g. miles per gallon. The scale 30 is two dimensional (offset vertical and horizontal rotary) and is indexed by several separate line markings 32, each of which extends in two-dimensions, and indicates a particular measure of fuel consumption rate related to distance. The scale 30 is transparent or translucent so that the level of the liquid colum 32 is clearly visible through the window 20 and the scale 30 to designate a location or line on the scale.

Th scale 30 is variously displaced relative the fluid column 22 on a rotative mounting, in accordance with the measured speed. In this manner, a line marking 32 is designated and accordingly, a value is manifest on the two-dimensional scale 30 by the combination of the measured values of speed and rate of fuel consumption per unit of time. More specifically, the scale 30 is variously displaced angularly, by rotation along a horizontal tangent, in accordance with the observed speed. The level of the fluid column 22 is displaced somewhat vertically in accordance with the rate of fuel comsumption per unit of time. The two observed phenomena are then integrated by the observation of the line marking 32 intersected by the level of the line-like fluid column 22. For example, referring to FIGURE 2, it may be seen that the level of the fluid column 22 indicates the rate of fuel consumption to be five gallons per hour, and furthermore, by observing the scale 30 it may be seen that the line marking 32 designating "5" is indicated to manifest a rate of fuel consumption of five miles per gallon. Thus, in addition to indicating the speed as shown in the window 18 on the face of the meter, rates of fuel consumption related to both time and distance are manifest by the instrument in easily readable form.

The displacement of the conical scale 30 and the establishment of a coincidence point thereon as by the level of the column 22 may be variously accomplished. However, considering the system as illustratively disclosed herein in greater detail reference will now be had to FIGURES 3, 4 and 5, showing the scale 30 as a transparent, thin-wall conical form closed, and mounted for rotation about its central axis. As shown in FIGURE 5, the line markings 32 on the exterior conical surface of the scale 30, are two-dimensional extending about the surface of rotation on the scale 30, and somewhat vertically as well. The markings 32 may for example, be etched or screened onto the surface of the conical scale 30, which may comprise plastic or various other materials capable of transparency to various degrees.

It is to be noted, that the scale 30 also includes a lower annular section 34 indexed by markings 36 indicative of speed, e.g. miles per hour. The markings 36 appear in the small window 18 of the instrument face, to indicate the speed of the vehicle in accordance with the angular displacement of the scale 30.

The scale 30 may take a variety of shapes other than conical, for example, it may be a disk or cylinder. Also the scale may be variously displaced in accordance with metered speed, for example, it may be mechanically coupled to a conventional tachometer or speedometer as widely employed in automotive use. However, as disclosed herein, the displacement of the scale 30 is accomplished for a water-borne vehicle by a dynamic pressure bellows as disclosed in detail below.

As shown in FIGURE 3, the thin-walled conical scale 30 is supported for rotation on a radially-extending leaf arm 38, one end 40 of which is tapered to smoothly abut the interior of the conical scale 30, while the other end is affixed to a rotatably-mounted axial rod 42. The rod 42 is fastened at its upper end 44 to a bias spring 46 (FIGURE 4) which is in turn fixed to an adjustment pin 48 (FIGURE 3) that is carried on a pivotal arm 50, rotatively mounted and frictionally held in position at the top of the instrument housing 52 by a rivet fastener 54. The adjustment pin 48 (FIGURE 7) of the assembly extends through an arcuate slot 56 in the housing 52 above the principal window 20, so as to be accessible to variously position the end of the spring 46 to in turn variously bias or adjust the scale 30.

The lower end of the axial rod 42, which supports the scale 30 for rotation, is journalled into a U bracket 58 the interior of which mounts a gear wheel 60, matably engaged with a cantilevered gear rack 62, the fixed end of which is attached to a bellows 64 (FIGURE 3). The bellows 64 as well as the gearing mechanism is supported by brackets 66 and 68 attached to the interior of the housing 50.

The bellows 64 is hydraulically connected to an intake tube (not shown) or other means (not shown) operating as a Pitot tube in cooperation with a vehicle, boat for example, carrying the instrument system. Thus the intake tube acts to variously pressurize the bellows 64 in accordance with the speed of the vehicle. That is, as the speed of the vehicle increases, the bellows 64 is subjected to an increased internal dynamic fluid pressure, with the result that the bellows expands, driving the gear rack 62 away from the bellows and thereby revolving the gear wheel 60 which in turn revolves the scale 30 by rotation of the axial rod 42 to overcome the force of the bias spring 46. Thus, the conical scale 30 is variously rotatively displaced from a reference position in accordance with the speed of a vehicle.

In the operation of the system described herein as an integrated instrument, the scale 30 is physically displaced from a reference position, to indicate one location on the two-dimensional scale. The other location or dimension to determine a point of coincidence is indicated by the level of a fluid column 22. The fluid column is contained in a tube 24 (FIGURE 6) the lower end of which is integral wth a fluid reservoir 70 which is in turn connected to a tubular duct 72. A similar duct 74 is connected to the top of the indicating tube 24 so that the application of a pressure differential across the ducts 72 and 74 variously displaces the column of fluid contained in the tube 24 so as to manifest such a pressure differential on the scale of indications 28 carried on the face of the mask 26. In the disclosed system, the pressure differential applied across the ducts 72 and 74 indicates the rate of fuel flow related to time, e.g., gallons per hour, thereby providing the other factor for integration to provide the desired measurement.

The tube 24, which may be integrally formed of glass with the ducts 72 and 74 and the reservoir 70, is fitted into an elongate slot 76 of the mask 26. The mask 26 is then fixed into the housing 52 (FIGURE 3) by a pair of integral brackets 78 joined to the axial rod 42 (FIGURE 7) by bolts 80 and a cross plate 82. The lower portion of the mask 26 is held supported in the housing 52 by spring cushions 84 (FIGURE 6) integrally formed with the mask and bent thereunder.

The tube 24, integral with the reservoir 70, is supported on a temperature-compensation movement 86 (FIGURE 4). The movement 86 is connected to receive an electrical signal indicative of the temperature of the fluid under observation, to variously displace the tube 24 for compensation. For example, if the fluid under observation, is at a lower temperature, it may be of higher density with the result that compensation is necessary. Therefore, the movement 86, which may take the form of various temperature controlled movements as well known in the prior art, simply displaces the tube 24 relative to the mask 26 to accomplish the desired compensation.

From the above description, it is apparent that the system hereof is capable of effectively manifesting an integrated measurement, as for example, miles per gallon, in use with any of a variety of powered vehicles. In using the system, various metering structures and techniques may be employed to displace the conical scale 30 as well as to set the level of the fluid column contained in the tube 24. As an example of one structure for positioning the fluid column, reference will now be had to FIGURES 8, 9 and 10, which disclose a sensor structure to accomplish a pressure differential proportionate the rate of fluid flow.

In general the function of the sensor is to detect the dynamic or ram pressure of the fluid stream and compare that pressure with the static fluid pressure. Therefore, the sensor is connected in the duct carrying the fluid stream so as to sense the desired pressures. Specifically, the fuel or other fluid under observation is passed through a housing 102, shown open in FIGURE 8, which is closed during use by a cover 104 as shown in FIGURES 9 and 10. Referring to FIGURE 8, the fluid enters the housing 102 through an intake port 106, at the lower right, and departs through an exit or exhaust port 108 at the upper right. The impact of the fluid flowing into the housing is sensed by a ram sensor embodied as a tube 110 extending from an open end 112 contiguous the intake port 106, to a helical portion 114 and terminating at an output pressure port 116 from which the "impact" or dynamic pressure is sensed. The "static" pressure in the chamber or housing 102 is sensed at a point remote the intake port 106, i.e., adjacent the outlet port 108 through the open end 118 of a duct or tube 120 formed somewhat similarly to the tube 110, and including a helical portion 122 which terminates at a static pressure output port 124.

The tube 110 senses the ram pressure of the fluid stream while the tube 120 senses the static pressure. The two pressures are then manifest at the output ports 116 and 124, and their differential is indicative of fluid flow rate. That is, the difference between the ram pressure and the negative or static pressure serves as a differential which may be used to displace the fluid column to indicate the rate of flow with respect to time, of the fluid under observation.

Considering the structure of flow rate indicator in greater detail, the housing 102 is of a generally parallelepiped configuration, incorporating a five-sided body 126, having threaded bores 128 entering the walls thereof at the open side, to receive studs 130 passing through the cover 104 and a gasket 132 to provide a chamber that is closed except for the various ports. The intake port 106 is provided through a threaded coupling 134 (FIGURE 9) which carries an internal collar 136 and an external collar 138, locking the coupling into the body 126 of the housing 102.

The open end 112 of the sensing tube 110 is held contiguous to the port 106 by being received through bores 139 and 141 in a pair of integrally-formed brackets 140 and 142 extending upward from the bottom 144 of the body 126. The tube 110 essentially floats axially free in the bores 139 and 141 through the brackets 140 and 142, so that the position of the end 112 of the tube relative to the port 106 may be established by an adjustment mechanism 146 (FIGURE 8). The mechanism 146 incorporates a swinging bracket 148 pivotally mounted at one end by a stud 150 which is anchored in a ledge 155 formed in the bottom 144 of the housing. The stud 150 passes through bores in the bracket 148 as well as a spacer bearing 156 (FIGURE 10) so that the bracket 148 is freely pivotal about the stud 150.

The bracket 144 is somewhat J shaped, with the upper arm 158 (FIGURE 10) receiving a pin 160 for coupling to the tube 110. The lower arm 162 of the bracket 148, extends to the side of the housing dwelling over a shelf 164 which carries a scale 166 (FIGURE 8). The enlarged end 168 of the bracket 148 contains an arcuate slot 170 through which a locking stud 172 passes to be threadably anchored in the shelf 164.

By pivotally swinging the bracket 148 about the stud 150, the pin 160 affixed to the tube 110 may be variously moved relative the port 106 so that the tube end 112 can be critically positioned as desired. Of course, after the critical positioning is accomplished, the locking stud 172 is turned down locking the tube in fixed position. It is to be noted, that the scale 166 indicates the locked position and thus serves to provide a guide for use in standardizing settings for a particular production run. It is also to be noted that the helical section 114 of the tube 110 accommodates the axial movement of the tube 110 relative the port 106. The other end of the tube 110 behind the helical section terminates at the port 116 that is threadably affixed to a coupling 174 which is in turn fastened in the wall of the body 126 by internally threaded nuts 176.

The tube 120 serving to sense the static pressure of the fluid, is very similar in structure and support to the tube 110. Specifically, as shown in FIGURE 8, the tube 120 is loosely held by brackets 178 and 179 integral with the body 126 and is axially adjustable relative the port 108 by a mechanism 180 incorporating a J-shaped bracket 182 fixed in position by studs 184 and 186 and engaged with the tube 120 by a pin 188. The enlarged end 190 of the bracket is affixed relative a scale 192 which indicates the setting of the tube end 118.

The tube end 118 actually dwells within the outlet bore 108 which incorporates a tapered section 193 into which the end 118 extends. The bore 108 is formed in a fitting 194 threadably locked into the wall of the housing, and including a threaded coupling 195.

In the operation of the system, the flow-rate indicator as shown in FIGURES 8, 9 and 10, is placed in the path of fluid feeding the engine propelling the vehicle by couplings 134 and 195. The fluid flows in through the port 106 providing a ram pressure at the signal port 116, and flows out of the port 108 to be delivered to the engine for consumption. The exit pressure or static pressure of the fluid is sensed through the tube 118 and manifest through the port 124. As a result, the pressure differential between the ports 116 and 124 indicates the rate at which fluid is flowing to the engine. This hydraulic signal information is applied by direct connection to the ducts 72 and 74 (FIGURE 6) of the manometer tube 24, to position the fluid column 22 relative the indications 28 on the mask 26 and thereby manifest the rate at which fuel is being consumed with respect to time, e.g. gallons per hour. The level of the fluid column in the tube 24 also indicates a location on the scale 30, thereby identifying one of the line markings 32 or some value thereinbetween to manifest the rate of fuel consumption as related to distance.

In some instances, certain variations from the system described above may be desired. For example, it may be desired to employ a completely mechanical indicator, also to avoid auxiliary apparatus in fuel paths by providing another form of fuel-flow sensor. Exemplary forms of such variations will now be considered, with subsequent reference to pertinent figures.

In certain applications, it may be desired to avoid any sensing apparatus in the path of the liquid fuel, while sensing the flow rate of such fuel. This arrangement can be accomplished by recognizing that there exists an optimum ratio between fuel and air in the mixture received by an engine, then sensing the rate of air flow as determinative of the rate of fuel flow. For example, it has been somewhat recognized that approximately fourteen parts of air to one part of fuel (by weight) provides a correct mixture for many internal combustion engines.

Utilizing the recognition of an established ratio, of fuel to air for an engine, structure may be provided to manifest rate of the fuel flow, from observations of rate of air flow. Examplarly forms of such structure are shown in FIGURES 11a and 11b, and will now be described.

In the structure of FIGURE 11a, a somewhat-conventional air filter 202 for a combustion engine is fed from an intake duct 203, through which, the rate of air flow can be related to the fuel consumption of the engine. Positioned in the duct 203 is a generally-cylindrical ram air adapter 204 which contains a concentric venturi 205, fixed to the walls of the adapter. The venturi then receives a venturi vacuum tube 206 connected at the throat as well known in the prior art, and a concentric ram pressure duct or tube 216 terminating in an impact adapter 214. The pressure provided by the impact adapter 214 is somewhat indirect and positive through the tube 207, while the venturi pressure is negative. These two sensors can be separately employed in certain installations, depending on conditions and demand, or used together by measurement of their differential as by a sealed device as well-known in the prior art. Of course, various forms of venturi structures are well known as are impact sensors. However, the adapter 214 is shown in detail in FIGURE 12 and is somewhat conical, having a concave base 218 which provides an air impact surface. The duct 216 is threadably received in the adapter 214, concentric to the base 218, so that an orifice 220 into the duct is contiguous the base 218. Thus, the pressure developed by air impacting on the surface of the base 218, is applied inside the duct 216, through the orifice 220. The pressure so developed being related to the rate of air flow, is therefore, a manifestation of the rate of fuel flow.

Of course, the form of the impact adapter may vary, and another form is shown in FIGURE 13 which includes a cylindrical section 222 (penetrated by a concentric frusto conical cavity 224) and integral with a concentric conical section 226. The cavity 224 serves as an effective air capture space, while the exterior surface of the conical section 226 tends to improve smooth flow into the air filter. In general, the impact adapter form as shown in FIGURE 13 produces pressure signals of greater intensity than the form of FIGURE 12; however, various applications can best be served in accordance with specific design considerations. In any event, the pressure differential provided between the tubes 206 and 216 is a manifestation of rate-of-fuel flow and is therefore applicable to a bellows 64 (FIGURE 3) or other output means, to provide a directly-readable indication (or physical displacement) of fuel-flow.

In some applications it may be desirable to employ only a venturi to obtain the fuel signal as a pressure differential relative to ambient pressure. Referring to FIGURE 11b, there is shown a fragmentary view of a representative carburetor 209 having a throat or venturi 210 into which the airflow draws fuel through a duct 211 from a reservoir 212. To obtain the desired signal indicative of air intake (and fuel flow) a passage 213 is provided, porting into the venturi and receiving a coupling 213a to be affixed to a duct for carrying the pressure signal. Thus, the pressure signal may be developed for application to a bellows or other means to accomplish a physical displacement indicative of fuel flow for use in the system as described herein.

In certain applications of the system hereof, it may be desired to provide the integrated manifestation, e.g. miles per gallon measurement, by means of a pair of mechanical members undergoing cooperative physical displacement. Such an arrangement may produce a scale and indicator display as shown in the fragmentary panel structure of FIGURE 14. The panel 230 has three windows 232, 234, and 236. The window 232 manifests rate of fuel flow, e.g. gallons per hour, while the window 236 provides indications of speed, e.g. miles per hour. The integrated measurement, e.g. miles per gallon, is then indicated in the window 234 by a movable scale and variable-length column indicator.

Considering the structure in greater detail, and the measurements shown, the elongate window 236 displays a slot 240 in which a bar indicator manifests speed in relation to a scale 242. A variety of well-known structures may be employed for this indicator, including a drum bearing a tapered area of color, that is displaced in accordance with speed to variously fill the slot 240 with a color bar proportional to speed, as well known in the prior art and as disclosed hereinafter. Indications of speed are also manifest in the window 234 by the scale or numbered-line designations 244 borne on the same drum with the indicator of the speedometer, the operation of which is considered below.

The window 232 indicates rate of fuel flow as a result of physical displacement of a scale 246 relative to a fixed pointer 248. The scale 246, as described below, is carried on a drum along with a tapered color area which is viewed through a slot 250 in the window 234 and indicates a designation 244 indicative of miles per gallon. That is, a color area provides a variable-length metering column or bar 252 through the slot 250, the termination of which selects the appropriate designation 244 on that scale to indicate the current rate of fuel consumption relative to distance.

Considering the structure in greater detail, reference will now be made to FIGURES 15 and 16 which show the scale-bearing drums that revolve to indicate speed and rate of fuel consumption, related both to time and to distance.

The drums are carried in a housing 254 affixed to the rear of the panel 230 (FIGURE 15). The drums are eccentrically mounted so that both are contiguous to the window 234 and are separated by the cylinder 256 which bears a mask 259 that defines the slot 250 through which a variable-length column is provided. The inside drum 258 is rotatively displaced in a counter clockwise direction in accordance with the time rate of fuel flow while the outside drum 260 is displaced in the same direction in accordance with the speed of the vehicle. The drums 258 and 260 are rotatively mounted on shafts 262 and 264 respectively for controlled displacement by meter movements as disclosed above for example.

The rotation of the inside drum 258 (FIGURE 16) is accomplished by a drive unit 266 having an output shaft 262a coupled to one end 268 of the drum 258 and borne on a support 271 that is fixed to the housing 254. The other end 270 of the inside drum is axially mounted on a shaft 262b, to be suspended within the housing 254.

The shaft 262a also carries a smaller drum 272 bearing the "gallons per hour" scale 246 displayed through the window 232. The rotation of the shaft 262a, as indicated, is accomplished by a unit 266 which may comprise a bellows controlled by a pressure signal as described above, or various other meter movements as well-known in the prior art. Thus, in proportion, the greater the displacement of the shaft 262a, the higher the number indicated in the window 232 (FIGURE 14) on the scale 246, and coincidentally, the longer the column or color bar 252 displayed in the slot 250 through the window 234.

For coordinated operation with the indication of the color bar 252, the larger drum 260 (FIGURE 16) is variously displaced in accordance with speed to properly set the scale numbered designations 244 (FIGURE 14) in the window 234. The displacement of the drum 260 also directly indicates speed as a color bar in the slot 240 as considered alone resulting from a colored area which is also borne on the drum 260, carried on a shaft 274 by means of a brace 276. In this regard, the fixed cylinder 256 holds the mounting bracket 279 to turn support the shafts 274 and 262b. Thus relatively little friction exists in the system.

The brace 276 is connected for drive to a speed indicator 278 which may comprise any of a variety of well-known speedometer movements to appropriately displace the drum 260. The displacement of the drum 260 thus properly sets the scale or numbered line designations 244 (FIGURE 14) to be read as designated by the color indicator bar 252, the length of which is determined by the displacement of the drum 258 (FIGURE 15). As a result, the two drums, each with means for rotational displacement in accordance with speed and fuel flow respectively, provide indications of speed, fuel consumption related to time and fuel conmuption related to distance.

It is to be understood that a wide variety of elements may be employed in systems constructed in accordance with the present invention and various output meters may be utilized. However, in this regard, it is to be noted that in the exemplary structures, a full set of indications are provided, and that good meter capabilities in relation to friction and the like are obtained. Furthermore, the desired measurement of miles per gallon is manifest in a form that is easy of perception by the human eye. Furthermore, it is readily apparent that the system may be embodied in a relatively economical form which requires very little maintenance over extended periods of use.

A further feature of the present invention resides in the fact that various other measurements as manifest by information signals can be readily metered in an integrated form in accordance with the teachings hereof. In this regard, the markings 32 on the scale 30 (FIGURE 5) and the designations 244 (FIGURE 14) mainfest a nonlinearly increasing value with increases of speed and fuel flow as described herein; however, the markings can be variously arranged to accomplish any desired relationship or the integration of component measured values as logically or mathematically defined.

Of course, other features and aspects of the present invention will become readily apparent to one skilled in the art along with obvious variations from the embodiments disclosed herein. Therefore, the scope of the present invention is not to be determined by such embodiments but rather in accordance with the following claims.

What is claimed is:

1. An instrument for manifesting values of distance related to fuel consumption for a combustion engine, comprising:
   means for manifesting a rate of fuel consumption as a continuously variable signal;
   means for manifesting a rate of travel;
   a substantially transparent figure rotatively mounted and indexed with a two-dimensional scale;
   means for rotatively displacing said figure in accordance with said rate of travel to thereby designate a location in one dimension on said scale; and
   signal driven means immediately adjacent to said figure for designating a location in the other dimension on said scale in accordance with said signal indicative of the rate of fuel consumption whereby viewed through said figure, the intersection of said designated locations in respective dimensions locates a point to manifest distance related to fuel consumption.

2. A system according to claim 1 wherein said figure comprises a generally conical member mounted for rotation about the axis thereof.

3. A system according to claim 1 wherein said figure comprises a generally cylindrical member and said means for designating a location includes a cylinder rotative relative a slot.

4. A system according to claim 1 wherein said means for manifesting a rate of fuel consumption includes:
   a housing,
   an inlet port for said housing for receiving fuel;
   an outlet port from said housing for discharging fuel;
   a first probe contiguous said inlet port for sensing the dynamic pressure contiguous said inlet port;
   a second probe contiguous said outlet port for sensing the static pressure contiguous said outlet port; and differential means for interconnecting said probes to provide an indication of rate of fuel flow.

5. A fluid sensor system for providing signals indicative of a fluid stream, comprising:
   a housing defining an intake port and an exhaust port for connection in said fluid stream;
   a first open tube including a helical section fixed in said housing whereby the open end thereof is contiguous to and coaxial with said intake port relative to which it is adjustable;
   a second open tube fixed in said housing whereby the open end thereof is remote said intake port and coaxial thereto;
   means connected to said first and said second tubes whereby to provide a pressure differential indicative of said fluid stream.

6. A system of instrumentation for use on a fuel-consuming engine-propelled vehicle, comprising:
   a somewhat transparent figure of rotation bearing a first scale extending in at least two dimensions and designating fuel flow relative to distance, and a second scale extending in at least one dimension and designating speed;
   means for rotating said figure of rotation in accordance with the speed of said vehicle;
   a variable length column means positioned behind said transparent figure contiguous said first scale whereby the position of said figure and the length of said column identify a specific value on said first scale; and
   means for controlling said variable length column in accordance with the fuel flow into said engine whereby to manifest fuel flow relative to distance by said first scale.

7. A system of instrumentation for use on a fuel-consuming engine-propelled vehicle, comprising:
a somewhat transparent figure of rotation bearing a first scale extending in at least two dimensions and designating fuel flow relative to distance, and a second scale extending in at least one dimension and designating speed; means for rotating said figure of rotation in accordance with the speed of said vehicle;
a variable length column means positioned behind said transparent figure contiguous said first scale whereby the position of said figure and the length of said column identify a specific value on said first scale;
means for sensing the rate of air flow into said engine as an indication of the rate of fuel consumption thereof; and
means for controlling said variable length column in accordance with said indication of the rate of fuel consumption of said engine.

8. A system in accordance with claim 7 wherein said variable length column means comprises a fluid column contained relative to an indicating means for presenting a variable length display.

9. A system in accordance with claim 7 wherein said variable length column means comprises a rotative member having a variable area thereon and a slot positioned to expose a variable length of said area in accordance with the displacement of said rotative member.

10. An instrument for manifesting values of distance related to fuel consumption for the internal combustion engine of a vehicle, comprising:
means for manifesting the rate of fuel consumption by said engine as a variable signal; a housing defining an intake port and an exhaust port for connection to pass fuel to said engine; a first open tube fixed in said housing to be coaxial with said exhaust port and contiguous thereto; a second open tube fixed in said housing to be coaxial with said intake port whereby the open end thereof is displaced from said intake port; and means connected to said first and second tubes whereby to provide a pressure differential signal indicative of said fuel flow;
means for manifesting the rate of travel of said vehicle as a physical displacement;
an indicating figure rotatively mounted and indexed with a two-dimensional scale, said figure being connected to be displaced in accordance with said physical displacement to thereby designate a location in one dimension on said scale;
signal driven means mounted adjacent said indicating figure, for designating a location in the other dimension on said scale, and connected to be driven by said variable signal according to fuel consumption, whereby the intersection of said designated locations in respective dimensions locates a point to manifest distance related to fuel consumption.

11. An instrument according to claim 10 wherein at least one of said tubes is longitudinally adjustable with reference to a coaxial port.

References Cited

UNITED STATES PATENTS

| | | | |
|---|---|---|---|
| 967,953 | 8/1910 | Morris | 73—205 |
| 1,057,631 | 4/1913 | Fowler | 73—212 |
| 1,530,061 | 3/1925 | Schroeder | 73—114 X |
| 1,540,747 | 6/1925 | Banning | 73—114 |
| 1,558,530 | 10/1925 | Wunsch | 73—205 |
| 2,565,310 | 8/1951 | Jones | 73—212 |
| 2,663,186 | 12/1953 | Nieburg | 73—114 |
| 3,246,508 | 4/1966 | Veach | 73—205 X |
| 3,308,655 | 3/1967 | Nichols | 73—114 |

FOREIGN PATENTS 526,083  3/1955  Italy.

RICHARD C. QUEISSER, *Primary Examiner.*
JERRY W. MYRACLE, *Assistant Examiner.*